US007674075B2

(12) United States Patent
Renard et al.

(10) Patent No.: US 7,674,075 B2
(45) Date of Patent: Mar. 9, 2010

(54) ASSEMBLY AND METHOD FOR INSTALLATION OF AN UNDERWATER STRUCTURE

(75) Inventors: Didier Renard, Courbevoie (FR); Sylvain Routeau, Saint-Cloud (FR)

(73) Assignee: Technip France (FR)

( * ) Notice: Subject to any disclaimer, the term of this patent is extended or adjusted under 35 U.S.C. 154(b) by 512 days.

(21) Appl. No.: 11/570,362

(22) PCT Filed: Jun. 8, 2005

(86) PCT No.: PCT/FR2005/001411

§ 371 (c)(1),
(2), (4) Date: Dec. 11, 2006

(87) PCT Pub. No.: WO2006/003307

PCT Pub. Date: Jan. 12, 2006

(65) Prior Publication Data

US 2008/0038066 A1    Feb. 14, 2008

(30) Foreign Application Priority Data

Jun. 10, 2004    (FR) .................................. 04 06293

(51) Int. Cl.
*E02D 17/20*    (2006.01)
*E02D 5/74*    (2006.01)
(52) U.S. Cl. ..................... 405/224; 405/302.7
(58) Field of Classification Search .................. 405/19, 405/195, 302.7
See application file for complete search history.

(56) References Cited

U.S. PATENT DOCUMENTS

| 3,396,542 | A | * | 8/1968 | Bruce ........................... 405/18 |
| 3,699,686 | A | * | 10/1972 | De Winter ................... 405/19 |
| 3,983,705 | A | | 10/1976 | de Boer ....................... 61/102 |
| 4,135,843 | A | | 1/1979 | Umemoto et al. ............. 405/18 |
| 4,449,847 | A | * | 5/1984 | Scales et al. .................. 405/19 |
| 4,592,675 | A | * | 6/1986 | Scales et al. .................. 405/19 |
| 6,290,431 | B1 | | 9/2001 | Exley et al. ................. 405/158 |
| 2002/0088622 | A1 | | 7/2002 | Beall et al. .................. 166/342 |

FOREIGN PATENT DOCUMENTS

DE    26 21 552    11/1977
JP    61242209    10/1986

OTHER PUBLICATIONS

International Search Report PCT/FR2005/001411 dated Oct. 4, 2005.

* cited by examiner

*Primary Examiner*—Tara Mayo-Pinnock
(74) *Attorney, Agent, or Firm*—Ostrolenk Faber LLP

(57) ABSTRACT

The invention concerns an assembly for installation of an underwater structure on the sea floor, said sea floor being covered with particles capable of being driven in suspension in the water above said sea floor, the mounting of said underwater installation capable of being implemented by an underwater robot driven by propulsion means, said propulsion means being capable of displacing the sea floor water and said suspended particles around said installation; said assembly comprising means (22, 26) for covering said sea floor surrounding said installation with a protective blanket (10) adapted to confine said particles on said sea floor.

12 Claims, 3 Drawing Sheets

ASSEMBLY AND METHOD FOR INSTALLATION OF AN UNDERWATER STRUCTURE

CROSS REFERENCE TO RELATED APPLICATION

The present application is a 35 U.S.C. §§371 national phase conversion of PCT/FR2005/001411, filed 8 Jun. 2005, which claims priority of French Application No. 0406293, filed 10 Jun. 2004. The PCT International Application was published in the French language.

BACKGROUND OF THE INVENTION

The present invention relates to an assembly and to a method of installing a subsea structure on the seabed.

One envisaged field of application is in particular, but not exclusively, that of connecting subsea pipes on the seabed.

Systems for connecting two assemblies that can move with respect to each other are known. They generally require the intervention of a subsea robot or ROV (remotely operated vehicle), which includes its own propulsion means and is equipped with cameras, manipulators and a control system allowing an operator to remotely control it from the surface.

However, the seabed is very often covered with silt, sediment and various particles which are liable to produce clouds around the robot by said propulsion means, when the latter are directed toward the seabed. Such a cloud necessarily obscures the field view of the cameras and consequently the operator's visibility. This reduction in visibility impedes the progress of the connection operations and, sometimes, requires the intervention by the robot to be interrupted. Furthermore, the suspended particles may be deposited between the joints of the pipes to be connected, which is liable to impair the quality of the seal at the junction.

To reduce the visibility of clouds of particles appearing, it has been imagined to limit the tilt of the subsea robot. Thus, the propulsion means of said robot are not far from a horizontal direction approximately parallel to the seabed, thereby preventing layers of water lying close to the seabed from being moved and consequently generating clouds of particles. The reader may refer in particular to patent application FR 2 763 636 which describes such a device.

However, these devices designed to keep the subsea robot horizontal are relatively complex and limit the degrees of freedom of the robot.

Moreover, the height of the subsea structures above the seabed is generally considerable, so that the subsea robots operate some distance from the seabed and thus do not disturb the layers of water lying close to the seabed by the propulsion means.

However, such structures are necessarily bulkier and consequently require suitable installation means, which generally increases the installation costs.

SUMMARY OF THE INVENTION

The problem that arises, and it is this that the present invention is intended to solve, is therefore how to provide a method of installing a subsea structure on the seabed which prevents clouds of particles being formed close to the seabed, which consequently makes it possible not only to reduce the size of said structures, but also to reduce the time required to operate the subsea robot.

For this purpose, according to a first subject, the present invention proposes a method of installing a subsea structure on the seabed, said seabed being covered with particles liable to be brought into suspension in the water above said seabed, said subsea structure being capable of being installed by a subsea robot being driven by propulsion means, said propulsion means being capable of moving the seabed water and said suspended particles around said structure; according to said method, said seabed is covered around said subsea structure with a protective mat designed to confine said particles on said seabed.

Thus, one feature of the present invention lies in confining the silt or particles deposited on the seabed by covering the latter with a protective mat. One of the faces of the protective mat therefore bears on the seabed, whereas the opposite, external, face is turned toward the surface of the water. Thus, when the subsea robot propulsion means are oriented in a direction that encounters the seabed, the moving water flows over the surface of the external face of the protective mat without moving the particles located beneath it. Thus, not only can the subsea robot be guided to a point a short distance from the seabed, thereby making it possible to install low structures, but in addition the robot operating time is optimized since at no moment is the visibility reduced.

According to one particularly advantageous embodiment of the invention, in a first step, said protective mat is wound up, and in a second step, said protective mat is unwound in order to cover said seabed. Thus, the rolled-up mat is protected from surface sea currents during its descent, as will be explained in greater detail in the description. Furthermore, after said first step, certain elements of said structure can be installed on the seabed without a protective mat impeding the installation. Next, the protective mat is designed to be unwound around the subsea structure.

According to a preferred embodiment of the invention, in said second step, a pressurized fluid is injected into flexible impermeable ducts fastened to said protective mat, said ducts being drained and wound up beforehand. Thus, said flexible impermeable ducts, for example consisting of hoses made of plastic-coated fabric, of the fire-hose type, make it possible to form means of deployment that are relatively simple and easy to implement.

Advantageously, in said first step, said mat and said ducts are wound up together by being rolled up in a defined direction and said ducts are fastened to said mat in said given direction. Thus, as soon as a pressurized fluid is injected into said ducts, they tend to extend longitudinally, stiffening up, and can then cause said protective mat to be unrolled in the opposite direction to the rolling-up direction.

According to another preferred embodiment of the invention, since said subsea robot includes controllable means for injecting a pressurized fluid, said ducts are connected to said controllable injection means in order to unwind said protective mat. Thus, thanks to the subsea robot which already has injection means consisting of a pump, the ducts can easily be unwound without further cost.

Particularly advantageously, since said structure comprises at least one structural element designed to be submerged from a surface installation and to rest on said seabed, said structural element is equipped with said protective mat to which said flexible impermeable ducts are fastened, and, before submersion of said structural element, said protective mat is wound up. Thus, the protective mat can be attached and wound up along the structural element in a particularly compact manner. This allows said element to be lowered onto the seabed without being impeded by the protective mat.

Furthermore, said protective mat is advantageously divided into portions in order to cover the seabed around the structure. Thus, for example, by dividing the protective mat into four equal portions and by placing said wound-up portions around the structure opposite each other in pairs, when they are deployed, the seabed around the structure can be at least partly covered.

According to another subject, the present invention proposes an assembly for implementing the aforementioned installation method, said assembly including means for covering said seabed around said structure with a protective mat designed to confine said particles on said seabed.

Advantageously, said protective mat consists of a flexible material suitable for being wound up and then unwound so as to cover said seabed. This flexible material consists for example of a resilient web of nonwoven fibers and is of course suitable for locking the particles against the seabed.

According to one particular method of implementing the invention, said means for covering said seabed include flexible impermeable ducts fastened to said protective mat, said ducts being capable of being brought from a first state in which they are wound up and drained to a second state in which they are filled with a pressurized fluid and in which they extend longitudinally. Thus, said impermeable ducts, formed for example from plastic-coated fabric hoses, are designed to be rolled up on themselves together with the protective mat. Thus, the air that they contain is completely expelled to the outside and as soon as a fluid is reinjected thereinto, they tend to extend longitudinally for unrolling said mat.

Moreover, according to one advantageous feature, said ducts are fastened to said mat in a given direction, which corresponds to the rolling-up direction of said mat. Thus, as soon as a fluid is injected into said ducts, they tend to extend in the rolling-out direction of said protective mat. This makes it possible to optimize the mechanical energy provided by said ducts.

Furthermore, since said subsea robot includes controllable means for injecting a pressurized fluid, said ducts are provided with connection means for connecting said controllable injection means to said ducts. Thus, thanks to the connection means for connecting the injection means and said ducts, and by controlling the subsea robot, the protective mat can be deployed.

Since said structure comprises at least one structural element designed to be submerged from a surface installation and for resting on said seabed, said structural element is advantageously equipped with said protective mat to which said ducts are fastened, said protective mat being wound up before submersion of said structural element. Thus, the structural element is designed to be lowered onto the seabed with the protective mat wound up. This avoids disturbing the descent and damaging the mat. It is only after the structural element has been deposited so as to rest on the seabed that the protective mat is unwound.

Moreover, said protective mat is preferably divided into portions distributed around said structural element so as to be able firstly to be easily wound up all around the structural element and subsequently for it to be unrolled radially around this structural element. In addition, the protective mat portions are not necessarily strictly rectangular—they may have parts that are rolled up in different directions. Thus, as will be explained in greater detail in the detailed description that follows, the entire perimeter of the region of the seabed on which the structural element rests can be covered by said protective mat.

BRIEF DESCRIPTION OF THE DRAWINGS

Other particular features and advantages of the invention will become apparent on reading the following description of particular embodiments of the invention, given by way of indication but employing no limitation, with reference to the appended drawings in which.

DESCRIPTION OF PREFERRED EMBODIMENTS

Figure 1:
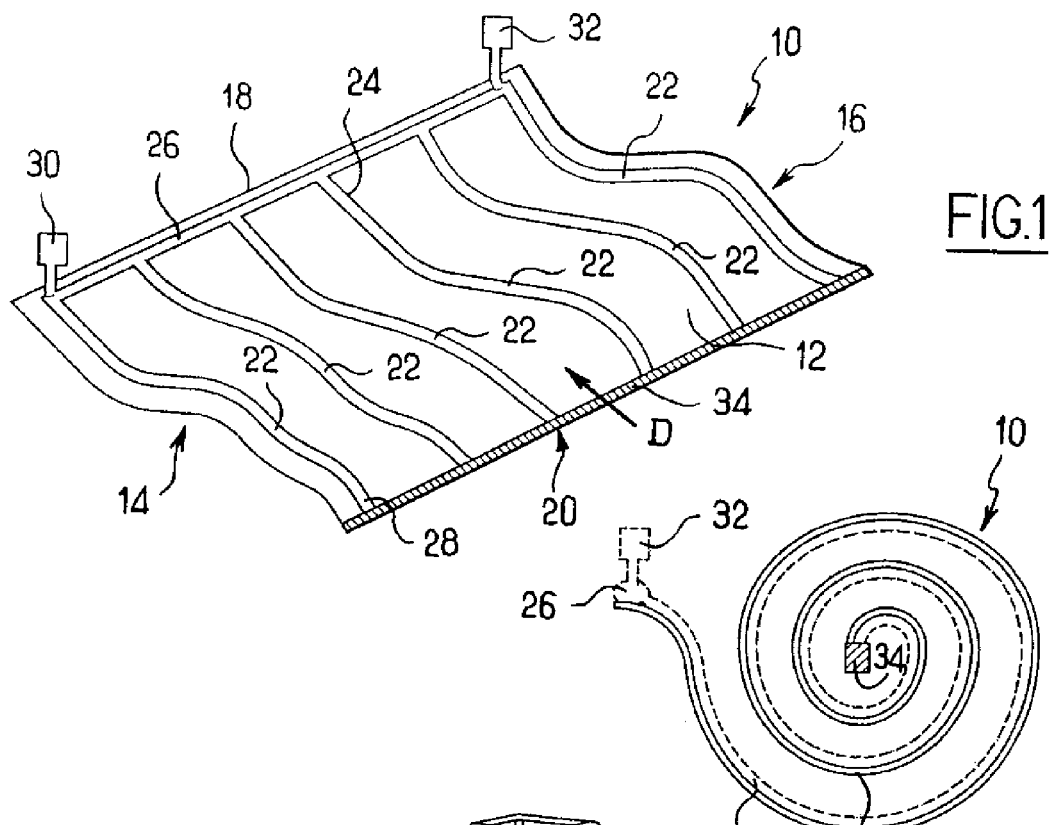
FIG. 1 is a perspective schematic view of an element of the invention.

FIG. 1 shows a protective mat 10 according to the invention. This protective mat 10 has a nonwoven textile web 12 of the geotextile type, used especially in constructional applications, for separating or stabilizing various aggregates for example and/or for filtering rainwater without these various aggregates being mixed.

These nonwoven textile webs 12 consist of a relatively tough sheet of fibers, for example polypropylene fibers. They have a thickness of between 200 and 900 microns, for example 500 microns, and a weight per unit area of between 50 and 500 g/m$^2$, for example 150 g/m$^2$. The nonwoven textile web 12 here is of rectangular shape, having two opposed lateral edges 14, 16, a fastening edge 18 and, opposite it, a free edge 20.

Moreover, flexible impermeable ducts 22 are fastened by stitching or bonding to the textile web 12 and are spaced apart, so as to be parallel to one another and to the two lateral edges 14, 16. These flexible impermeable ducts 22 consist for example of plastic-coated fabric hoses, used especially as fire hoses. They have the advantage of being able to be flattened, their two opposed walls bearing against each other, when they are empty and thus of being rolled up in a compact manner. However, as soon as a pressurized fluid is injected into these rolled-up flexible impermeable ducts 22, they extend longitudinally and become relatively rigid.

Here, these ducts 22 are connected together at their ends 24 located near the fastening edge 18 by a manifold 26 whereas their opposite ends 28, located near the free edge 20, are blocked off. The manifold 26, which extends along the fastening edge 18, has two terminations 30, 32, and the flexible impermeable ducts 22 connected to the manifold 26 form a closed circuit between the two terminations 30, 32.

Furthermore, a relatively heavy rod or lath 34 is fastened to the free edge 20 of the textile web 12. This rod may be replaced with a cable or a tube.

Figure 2:
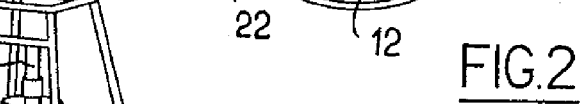
FIG. 2 is a cross-sectional schematic view of the element illustrated in FIG. 1, as rolled up.

FIG. 2 illustrates the protective mat 10 in rolled-up form. This figure shows the lath 34 around which the textile web 12 and the flexible impermeable ducts 22 have been rolled up.

These flexible impermeable ducts 22 are shown here as broken lines so as to better distinguish them.

The protective mat 10 thus rolled up in a direction D parallel to the opposed lateral edges 14, 16 and to the ducts 22 is relatively compact and the flexible impermeable ducts 22 are substantially rolled up with the textile web 12, each in one and the same plane.

Figure 3:
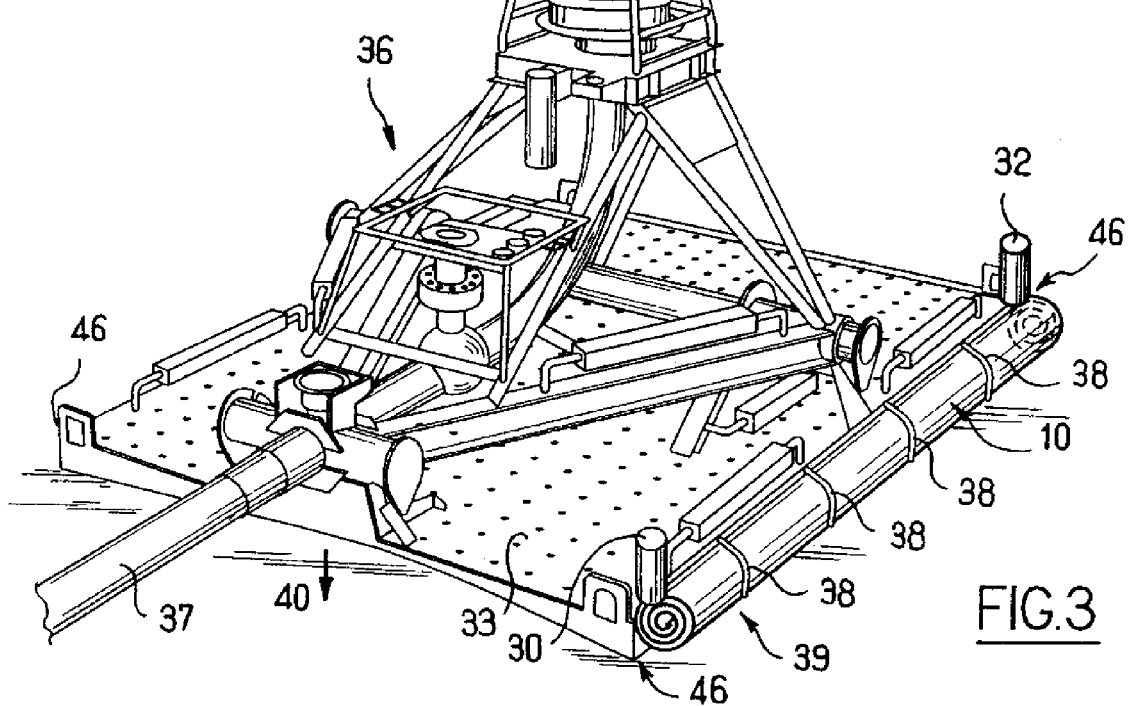
FIG. 3 is a perspective schematic view showing part of a subsea structure equipped with the element illustrated in FIG. 2, in a first state.

Referring now to FIG. 3, this illustrates in perspective a structural element 36 of a subsea structure, equipped with a protective mat 10 as shown in cross section in FIG. 2. This structural element 36, which includes a rectangular support plate 33, is fastened to a subsea pipe 37 and allows the latter to be connected, for example to a riser (not shown) via an elbow extending the subsea pipe 37, which elbow terminates in a termination 35. The protective mat 10 here is kept rolled up, along one edge 39 of the rectangular support plate 33 of the structural element 36 by fasteners 38 of the type used to keep the cables of a cable tray together. However, they differ therefrom by the presence of a fracture initiator, which allows them to break as soon as they are subjected to an elongating force above a specified threshold.

According to another embodiment (not shown) the protective mat 10 thus rolled up is held in place by Velcro-type loops and hooks, said strips being closed up on themselves. Thus, and in the same way as the aforementioned fasteners, as soon as these strips undergo an elongation, the hooks release the loops and the strips are detached. Moreover, the mat may also be protected by a flexible or rigid cover.

Thus equipped, the structural element 36 is designed to be submerged from a surface installation (not shown) down to the seabed 40 so as to rest thereon, said rectangular support plate 33 being against said seabed 40. The termination 35 is then located at a certain distance, less than 10 m, for example 5 m, from the seabed 40.

FIG. 3 also shows the two terminations 30, 32 that can be connected to pressurized fluid-injection means on a subsea robot (not shown). Subsea robots, remotely controlled from the surface and designed to connect subsea pipes, usually include water injection pumps capable of taking up seawater and discharging it under pressure. Thus, the subsea robot is designed to connect the two terminations 30, 32 to its water injection means in order to deliver pressurized seawater into the manifold 26 and into the flexible impermeable ducts 22. This delivery pressure is between 3 and 10 bar, for example 6 bar.

Figure 4:
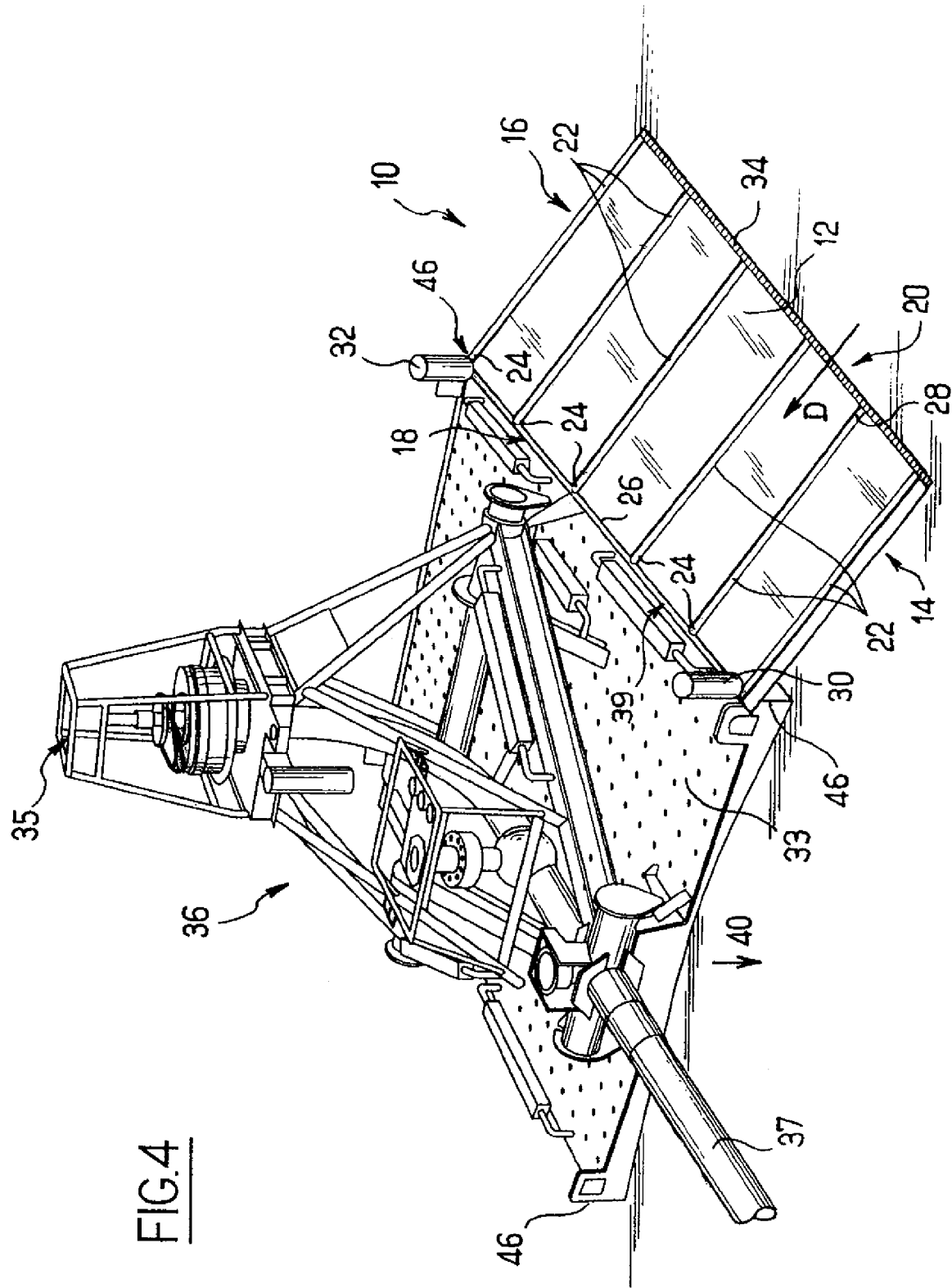
FIG. 4 is a perspective schematic view of a structure illustrated in FIG. 3, equipped with the element illustrated in FIG. 2, in a second state.

Referring now to FIG. 4, this illustrates the structural element 36 and the protective mat 10 after pressurized water has been injected into the manifold 26. By injecting pressurized water into the manifold 26, the impermeable ducts 22 now extend longitudinally, unrolling the textile web 12 in the direction opposite to the rolling-up direction, causing the heavy lath 34 to rotate and move translationally. Thanks to this lath, which nevertheless offers a certain resistance to extension of the permeable ducts 22, the textile web 12 is kept in place resting on the seabed 40. Thus, the protective mat 10 remains resting on the seabed 40, despite the seabed currents.

The structural element 36 shown in FIGS. 3 and 4 is equipped with a protective mat 10 consisting of a single portion fitted along a single edge 39 so as to simplify the drawing. This portion, which is substantially rectangular, the fastening edge 18 measuring between 4 and 5 m, for example 4.5 m, and the lateral edges 14, 16 measuring between 3 and 4 m, for example 3.5 m, once it has been deployed covers only part of the seabed around the structural element 36. Consequently, the other three edges of the rectangular support plate may be equipped in the same way with three other portions of protective mat 10, allowing the entire perimeter of the structural element 36 to be covered.

Furthermore, since the other three portions are of rectangular symmetry and the edges of the rectangular support plate 33 are inclined relative to one another at angles of 90°, the portions are joined substantially in the corners 46 of the rectangular support plate 33, leaving four spaces where the seabed 40 between each portion of protective mat 10 are left free.

To cover these square parts of the seabed, located in the extension of the diagonals of the rectangular support plate 33, the portions of protective mat 10 are equipped with complementary attachable corner pieces.

Figure 5:
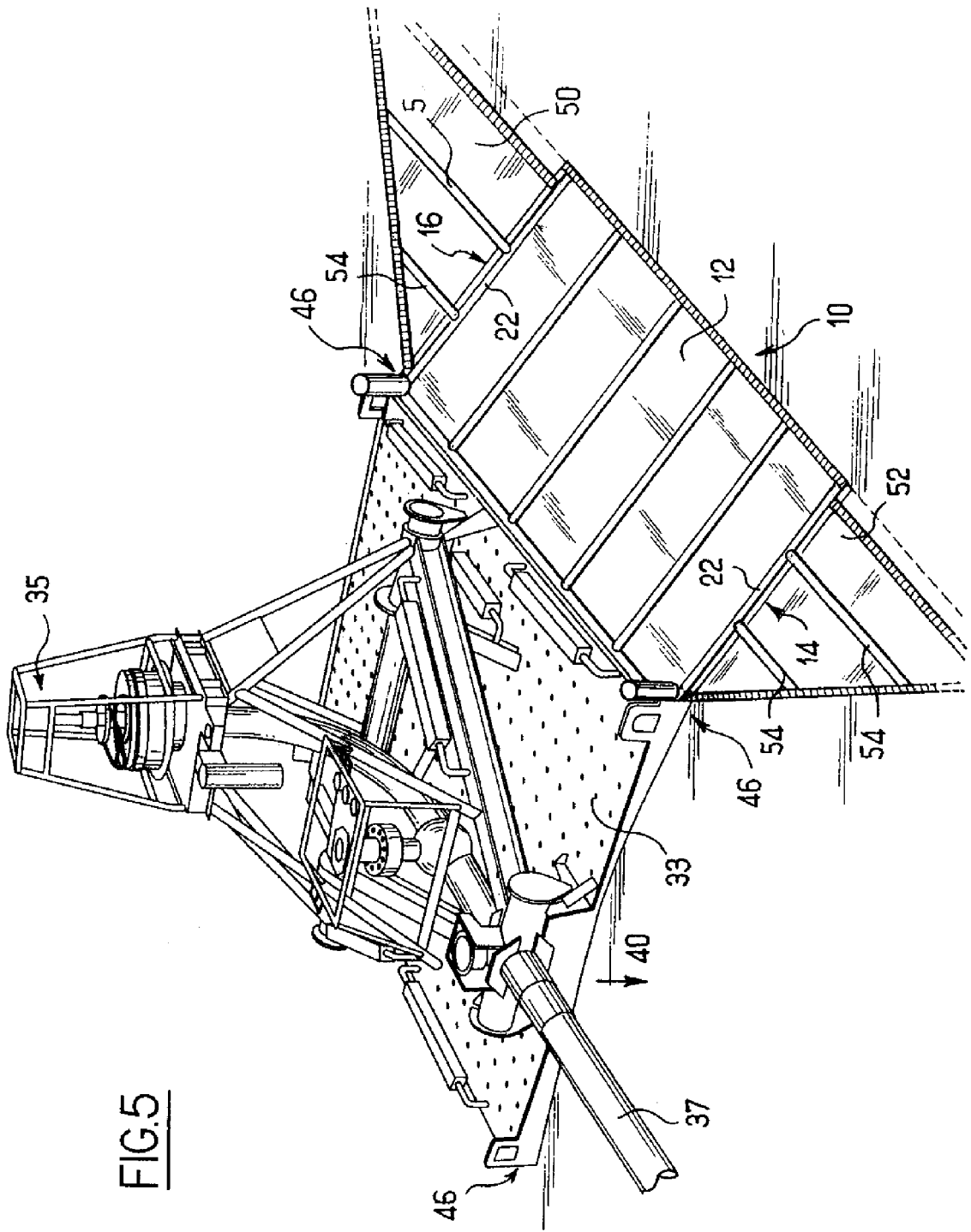
FIG. 5 is a perspective schematic view of a structure identical to that of FIGS. 3 and 4 above, equipped with an element according to one particular embodiment.

Referring now to FIG. 5, this illustrates in another embodiment a protective mat portion equipped with two attachable triangular corner pieces.

This FIG. 5 again shows the structural element 36 illustrated in the previous two figures, which is equipped with an identical portion of protective mat 10. However, the textile web 12 has a right triangular corner piece 50, articulated on one of the lateral edges 16, and a left triangular corner piece 52, articulated to the other lateral edge 14. The longest sides of the triangular corner pieces correspond substantially to the two respective diagonals of the triangular support plate.

Furthermore, these triangular corner pieces 50, 52 are also equipped with flexible impermeable ducts, here secondary impermeable ducts 54 that extend substantially perpendicular to the opposed lateral edges 14, 16 and are connected to the respective two ducts 22 that run along these opposed lateral edges 14, 16. However, in another embodiment (not shown), a secondary supply network is provided, this being directly connected to the secondary impermeable ducts 54, independently of the manifold 26. This secondary supply network can then be supplied independently of the manifold 26 and in particular after the rectangular part of the textile web 12 has been deployed, so as to simplify the deployment of these lateral triangular corner pieces 50, 52.

Thus, by equipping the three other portions of protective mat (which are not shown here) with triangular corner pieces designed to cooperate together, the entire perimeter of the structural element 36 can be covered with a protective mat over a width of about 5 m. Furthermore, in order for the protective mat 10 and these various portions, including the attachable corner pieces, to be completely wound up, said corner pieces are firstly rolled up perpendicular to the opposed lateral edges 14, 16 in the direction of their secondary impermeable ducts 54 toward their portions to which they are attached and, thereafter, each of the portions is rolled up toward its respective fastening edge, as indicated in FIG. 3.

The structural element 36, equipped with the protective mat 10 thus rolled up, can be deposited on the seabed 40. This protective mat 10 can then be deployed by means of subsea robots, as described above. The rectangular portions of the protective mat 10 that run along the edges of the rectangular support plate begin by being unrolled and then, once they have been unrolled, it is the attachable triangular corner pieces that are unrolled, thanks to the secondary impermeable ducts 54 that extend along their longitudinal direction and in the direction opposite to the impermeable ducts 22 to which they are connected.

Thus, silt, particles or sediment covering the seabed 40 around the rectangular support plate 33 are entirely covered by the protective mat 10. Thus, despite the relatively short distance that separates the termination 35 from the seabed 40, when a subsea robot is used to connect, for example, a riser to the termination 35, its propulsion means disturb essentially the water layers located on the surface of the protective mat 10. This raises no particles and does not increase the cloudiness of the water near the structural element 36.

Of course, the subject of the present invention can be applied to any type of subsea structure, for example, and according to a nonlimiting list, PLETs (pipeline end terminations), PLEMs (pipeline end modules), ILTs (in-line tees) or UDUs (umbilical distribution units).

The invention claimed is:

1. A method of installing a subsea structure on a seabed, wherein the seabed is covered with particles liable to be brought into suspension in the water above the seabed, and the subsea structure being capable of being installed by a subsea robot that is driven by propulsion means, wherein the propulsion means is capable of moving the seabed water and the suspended particles around the structure, and the seabed being covered around the subsea structure;

the method comprising providing a flexible protective mat including flexible impermeable ducts fastened to the protective mat; winding up the protective mat together with the flexible impermeable ducts;

lowering the wound up mat toward the seabed;

unwinding the protective mat by injecting a pressurized fluid into the flexible impermeable ducts in order that the mat may cover the seabed to confine the particles on said seabed.

2. The method of installing a subsea structure as claimed in claim 1, wherein the protective mat and the flexible impermeable ducts are wound up together by rolling them up in a defined direction (D), wherein the flexible impermeable ducts are fastened to the protective mat and extend in the defined direction.

3. The method of installing a sub sea structure as claimed in claim 1, wherein the subsea robot includes controllable means for injecting a pressurized fluid, and the method further comprises connecting the flexible impermeable ducts to the controllable injection means and operating the injection means to inject the fluid into the ducts in order to unwind the protective mat.

4. The method of installing a subsea structure as claimed in claim 1, wherein the subsea structure comprises at least one structural element for being submerged toward the seabed, the method further comprising equipping the structural element with the protective mat to which the flexible impermeable ducts are fastened, and before the submerging of the structural element, winding up the protective mat.

5. The method of installing a sub sea structure as claimed in claim 4, wherein the protective mat is divided into portions so that the mat when unwound covers the seabed around the subsea structure.

6. An assembly for installing a subsea structure on a seabed, the wherein the subsea structure is capable of being installed on the seabed by a subsea robot which is driven by propulsion means, wherein the propulsion means is capable of moving seabed water and suspended particles around the structure, the assembly including a covering for covering the seabed around the subsea structure;

the covering including a protective mat comprised of a flexible material suitable for being wound up and flexible impermeable ducts fastened to the protective mat, the ducts being capable of being brought from a first state in which they are wound up within the mat and drained to a second state in which the ducts are filled with a pressurized fluid and in which the ducts extend longitudinally, to be operable to cause the protective mat to unroll in a direction opposite to the rolling-up direction, whereby the unrolled mat may confine particles on the seabed.

7. The assembly for installing a subsea structure as claimed in claim 6, wherein the protective mat is capable of being wound up by being rolled up in a defined direction and the flexible impermeable ducts are fastened to the protective mat and extend in the defined direction.

8. The assembly for installing a subsea structure as claimed in claim 7, wherein the ducts are spaced apart over the mat.

9. The assembly for installing a subsea structure as claimed in claim 6, wherein the flexible impermeable ducts include connections for connecting the controllable injection means of the subsea robot to the flexible impermeable ducts.

10. The assembly for installing a subsea structure as claimed in claim 6, wherein the subsea structure comprises at least one structural element designed to be submerged toward the seabed, and the structural element is equipped with the protective mat to which the ducts are fastened, so that the protective mat is wound up before submersion of the structural element.

11. The assembly for installing a sub sea structure as claimed in claim 10, wherein the protective mat is divided into portions distributed around the structural element.

12. The assembly for installing a subsea structure as claimed in claim 6, wherein the ducts are spaced apart over the mat.

* * * * *